March 11, 1958 A. J. PRITCHARD 2,826,466
IDLER ARM CONVERSION KIT
Filed Dec. 28, 1956
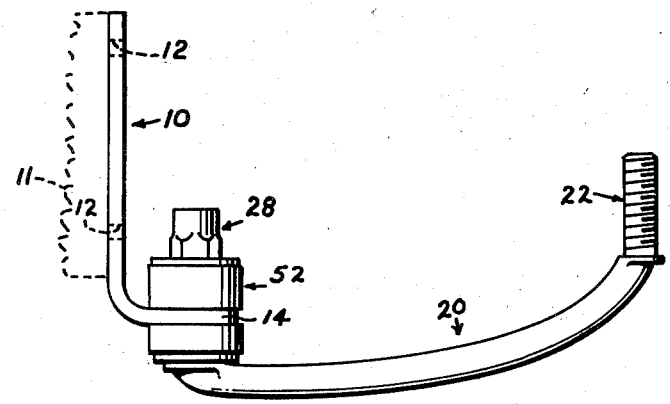
FIG. 1
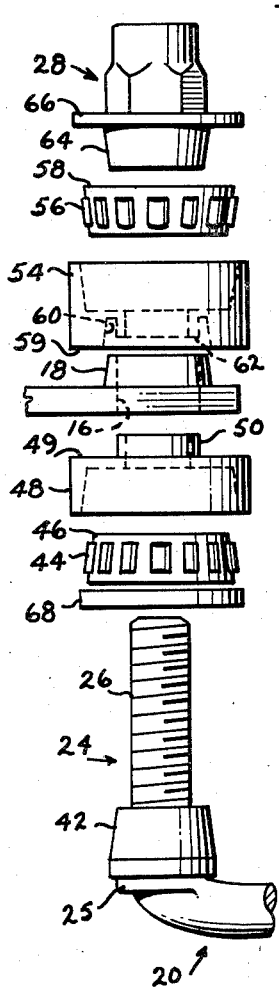
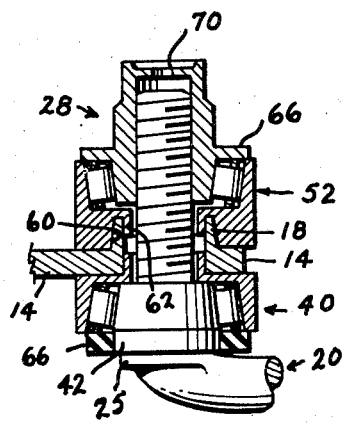
FIG. 3  FIG. 2
Arnold J. Pritchard,
INVENTOR.
BY Royal J. Miller
ATTORNEY United States Patent Office 2,826,466
Patented Mar. 11, 1958

2,826,466
IDLER ARM CONVERSION KIT
Arnold J. Pritchard, Carnegie, Okla.
Application December 28, 1956, Serial No. 631,337
4 Claims. (Cl. 308—207)

The present invention relates to automobiles and more particularly to a repair or replacement kit for worn idler arms and brackets of most automobiles.

It is conventional practice at present to equip the right hand end portion of the tie-rod connecting the front wheels with an idler arm. The idler arm comprises a relatively short member which is pivotally attached at one end to the adjacent right hand end portion of the tie-rod and is pivotally connected at its opposite end to a bracket carried by the frame of the vehicle. The purpose of the idler arm is to add support and stability to the steering mechanism and to effect easier steering of the vehicle. Because of the almost continuous oscillating movement of the idler arm relative to the bracket it is difficult to maintain a wear free snug pivoting connection between these two members with conventional equipment. It is to the construction and arrangement of parts of this pivoting connection that the present invention relates.

The principal object of the present invention is to provide a bearing coupling for interconnecting an idler arm with its supporting bracket which will eliminate idler arm wear, rattle, sagging and looseness of its connection.

A similarly important object of the present invention is to effect positive setting of wheel toe-in alignment and to maintain the same under road shock encountered by the wheels.

Another object is to provide an idler arm connection of this class which will permit easier steering of the vehicle.

An additional object is to provide a repair kit of this class which utilizes most of the conventional equipment in co-operation with additional parts to effect the repair.

A further object is to provide a means for repairing a worn idler arm connection in which a pair of bearings permit metal to metal contact of the oscillating parts thereby eliminating the use of resilient bushings which tend to deteriorate with age.

Still another object of this invention is to provide an idler arm connection which eliminates the usual strain applied to the threads of the idler arm by the original equipment.

The present invention accomplishes these and other objects by providing a pair of anti-friction roller bearings adapted to be carried by the end of an idler in contact with and on opposing sides of the idler arm bracket. A cylindrical flange axially carried by each of the bearing races cooperatively projects into the aperture of the idler arm bracket for centering the idler arm within the same. The conventional idler arm nut holds the assembled parts in metal to metal contacting pivotal relation.

Other objects will be apparent from the following description when taken in conjunction with the accompanying one sheet of drawing, wherein:

Figure 1 is an elevational view of the device in operating position;

Figure 2 is a vertical cross sectional view of the device, a portion thereof being shown in elevation; and Figure 3 is an elevational exploded view of the device illustrating the relative position of the parts thereof.

Like characters of reference designate like parts in those figures of the drawings in which they occur.

In the drawings, the reference numeral 10 indicates, as a whole, a substantially L-shaped conventional idler arm bracket secured vertically to the chassis frame 11 by bolts not shown, extended through perforations 12 thus substantially disposing the other end portion 14 of the bracket horizontally. The end portion 14 is provided with an aperture or perforation 16 and an integral upstanding annular flange 18 surrounding the aperture. The outer wall of the flange 18 tapers toward its free end thus forming in general configuration, a substantially frustoconical flange. The inner wall of the flange is cylindrical and in alignment with the aperture 16.

A conventional substantially U-shaped idler arm 20 has one end portion 22 connected to the tie-rod or drag link, not shown, in a conventional manner. The opposite end portion 24 of the idler arm is provided with a shoulder 25 and that portion of the arm projecting beyond the shoulder is threaded as at 26, and is adapted to be extended vertically upward through the aperture 16, flatly disposing the shoulder 25 against the under side of the bracket end 14. An idler arm nut 28 threadedly engaged with the idler arm impinges a resilient bushing, not shown, between the nut and the bracket end 14. Thus the entire load or strain placed on the idler arm is carried by the threads 26.

The above description of parts using numeral 10 to 28, inclusive, is more or less conventional with idler arm installations and forms no part of the present invention other than to set forth a workable combination or relationship of parts with which the present invention is designed to operate.

In carrying out the invention the idler arm 20 is removed from the bracket end 14 and a first or lower anti-friction thrust type tapered roller bearing 40 is installed on the idler arm end 24 adjacent the lowermost side of the bracket end 14. The bearing 40 is more or less conventional with this type of bearings having a cone 42 which is seated against the shoulder 25 of the idler arm. The bore of the cone 42 is closely received by the end 26 of the idler arm. The bearing 40 further includes anti-friction rollers 44 supported by a tapered carriage 46 co-operatingly received by the recess of a bearing race 48 and the cone 42 as is conventional. The bearing race is substantially cylindrical in general configuration having one end or face 49 contiguously contacting the lowermost surface of the bracket end 14 and having an axial opening therethrough and a substantially cylindrical upstanding annular flange 50 surrounding the opening. Diametrically the opening through the race 48 and flange 50 is slightly greater than the diameter of the threaded end portion 24 of the idler arm as is clearly shown in Fig. 2. The outer cylindrical wall of the flange 50 is closely received by the wall of the aperture 16 in the bracket end 14. The longitudinal length of the flange 50 is preferably less than the thickness of the bracket end 14 for the purposes which will presently be apparent.

Similarly a second or upper anti-friction thrust type roller bearing 52 is installed on the idler arm end 24 adjacent the uppermost side of the bracket end 14. The bearing 52 includes a race 54 which similarly receives anti-friction rollers 56 supported by a tapered carriage 58. The race 54 is substantially cylindrical in general configuration having one end or face 59 contiguously contacting the uppermost surface of the bracket end 14 and having an axial opening therethrough and an annular recess 60 formed therein defining a depending substantially cylindrical annular flange 62 surrounding the axial opening of the race within the recess. The outer wall of the recess 60 tapers outwardly and downwardly for co-operatingly receiving the outer wall of the annular flange 18 carried by the bracket end 14. Diametrically the bore of the opening through the race and the flange 62 is slightly greater than the diameter of the idler arm end 24 as shown in Fig. 2. The outer wall of the flange 62 is similarly closely received by the inner wall of the bracket flange 18. The longitudinal length of the flange 62 is preferably less than the length of the upstanding bracket flange 18 so that the adjacent ends of the two flanges 50 and 62 carried by the races 48 and 54, respectively, are disposed in spaced-apart relation within the aperture 16 of the bracket.

One end of the idler arm nut 28 is co-operatively tapered with relation to the taper of the bearing carriage 58 to form a bearing cone 64 on the end of the nut for supporting the upper bearing rollers 56. Thus relative adjustment of the nut 28 on the threads 26 of the idler arm end 24 impinges the bracket end 14 between the two bearings 40 and 52. Since the nut 28 and bearing cone 42 are snugly carried by the idler arm end 24 and the bore through each of the races 48 and 54 are diametrically greater than the idler arm end portion 24 the entire oscillating movement is carried solely by the bearings 40 and 52.

The upper bearing 52 is preferably sealed by an annular flange or ring 66 integrally carried by the nut 28 intermediate its ends which overlies the upwardly disposed open end of the race 54. Bearing sealing means in the form of a synthetic rubber washer or ring 68 is carried by the bearing cone 42 for closing the downwardly open end of the bearing race 48.

The free end 70 of the nut 28 may be threaded and a stud bolt and lock nut, not shown, inserted therein for locking the nut 28 in a conventional manner to hold the same in a desired adjusted position.

Obviously the invention is susceptible to some change or alteration without defeating its practicability, and I therefore do not wish to be confined to the preferred embodiment shown in the drawings and described herein, further than I am limited by the scope of the appended claims.

I claim:

1. An idler arm coupling and bearing for interconnecting an idler arm and idler arm bracket for pivoting movement of the idler arm relative to the idler arm bracket, said idler arm having a shoulder adjacent one end and having that end portion of the arm beyond the shoulder externally threaded, said idler arm bracket having an aperture therethrough with an upstanding annular flange for receiving the threaded end portion of said idler arm therethrough, said annular flange having a tapered outer wall and a cylindrical inner wall, said tapered outer wall converging toward the free end of the flange, including: a lower bearing cone carried by said idler arm adjacent said shoulder; a lower bearing race having a central aperture for receiving the threaded end portion of said idler arm therethrough, said lower bearing race having an upstanding cylindrical annular flange surrounding the aperture therein closely received by said cylindrical wall of said annular flange on said idler arm bracket; an upper bearing race having a central aperture for receiving the threaded end portion of said idler arm therethrough, said upper bearing race having a recess surrounding the aperture therein for co-operatively receiving said tapered outer wall of said annular flange on said idler arm bracket, said upper bearing race having a depending cylindrical annular flange surrounding the aperture therein closely received by said cylindrical wall adjacent the free end of said annular flange on said idler arm bracket; an idler arm nut threadedly engaged with the threaded end portion of said idler arm projecting through said idler arm bracket; said idler arm nut having one tapered end forming a cone for said upper bearing; and roller bearings carried by said upper and lower bearing races and said cones, whereby said bearings concentrically maintain the threaded end portion of said idler arm within the aperture in said idler arm bracket.

2. Structure as specified in claim 1 and a sealing ring carried by said idler arm adjacent said shoulder for sealing the lowermost side of said lower bearing; and an annular flange integrally carried by said idler arm nut intermediate its ends for sealing with the upper surface of said upper bearing.

3. An idler arm coupling and bearing for interconnecting an idler arm and idler arm bracket for pivoting movement of the idler arm relative to the bracket, said idler arm having a shoulder adjacent one end and having that end portion of the arm beyond the shoulder externally threaded, said idler arm bracket having an aperture therethrough with an upstanding annular flange for receiving the threaded end portion of said idler arm therein, said annular flange having a tapered outer wall and a cylindrical inner wall, said tapered outer wall converging toward the free end of the flange, including: a lower bearing cone carried by said idler arm adjacent said shoulder; a lower bearing race having a central aperture for receiving the threaded end portion of said idler arm therethrough, said lower bearing race having a cylindrical upstanding annular flange surrounding the aperture therein for insertion into the aperture of said bracket; an upper bearing race having a central aperture for receiving the threaded end portion of said idler arm therethrough, said upper bearing race having a recess surrounding the aperture therein for cooperatively receiving the tapered outer wall of the annular flange on said bracket, said upper bearing race having a cylindrical annular flange within the recess surrounding the aperture therein for insertion into the cylindrical wall of the free end of the annular flange on said bracket; an idler arm nut threadedly engaged with the threaded end portion of said idler arm, said idler arm nut having one tapered end forming an upper bearing cone; and roller bearings carried by said upper and lower bearing races.

4. Structure as specified in claim 3 and a sealing ring carried by said idler arm adjacent said shoulder for sealing the lowermost said bearing; and an annular flange integrally carried by said nut intermediate its ends for sealing with the uppermost said bearing.

References Cited in the file of this patent

UNITED STATES PATENTS 2,392,633    Bierman _____ Jan. 8, 1946